June 8, 1965   D. K. TAYLOR   3,187,503
ROCKET ENGINE CONSTRUCTION
Filed May 1, 1962

INVENTOR.
DONALD K. TAYLOR
BY
Bean, Brooks, Buckley & Bean
ATTORNEYS

United States Patent Office 3,187,503
Patented June 8, 1965

3,187,503
ROCKET ENGINE CONSTRUCTION
Donald K. Taylor, Dunkirk, N.Y., assignor to Bell
Aerospace Corporation, Wheatfield, N.Y.
Filed May 1, 1962, Ser. No. 191,571
4 Claims. (Cl. 60—35.6)

This invention relates to the field of rocketry and in particular is directed to an improved rocket engine construction and insulating means therefor.

As concerns rocket engines in general, the construction should be such as to incorporate as little weight penalty as possible and as little complexity as possible while, at the same time, the construction should be of sufficient structural rigidity and should also be of such nature as to avoid any material interior dimensional changes due to corrosion and/or erosion during use. Unfortunately, known materials which possess sufficient structural rigidity do not adequately resist the corrosion and/or erosion effects of the gaseous products of fuel decomposition. To overcome these problems, various ablative substances have been used to line the interior of a rocket engine. However, such substances, by their very nature, inexorably produce internal dimensional changes as ablation progresses. Because such dimensional changes detrimentally affect the thrust characteristics of the engine, no substantial degree thereof can be tolerated. Thus, this proposed solution is characterized by exceedingly short life, itself a serious problem. Another common solution involves the use of heat sink means, such as disclosed in Patent No. 2,935,841, in which the walls of the rocket engine are provided with passages through which fuel, en route to the combustion chamber, is circulated. The objective here is to sufficiently cool the internal wall surfaces as to impede corrosion and/or erosion. Such a design suffers from complexity as well as weight penalty, the walls of necessity being rather thick and heavy.

Added to the above problems with rocket engines in general is the further difficulty of thermal shock which may be encountered in situations where the rocket engine must be started while relatively cold. For example, a rocket engine or rocket engine system used for attitude control purposes on an orbiting vehicle may encounter extreme thermal shock whenever use is dictated after lengthy shut down. In such a situation, a rocket engine which may perform acceptably under other conditions may well suffer loss of structural integrity due to thermal shock.

It is, therefore, a primary object of this invention to provide an improved rocket engine combination in which internal insulating means is utilized to overcome all of the above difficulties. Thus, within the realm of this invention is envisaged a rocket engine having a relatively light weight shell which functions primarily as a structural element and which is provided with an internal lining of novel construction characterized by its ability to insulate the shell not only from corrosion and/or erosion but also from thermal shock. Additionally, it is a feature of this invention that the lining or insulation be of such character as to obviate significant dimensional changes during use.

More specifically, the present invention deals with a material of the nature and for the purposes specified which is, in effect, a compound or composite material. Moreover, the natures of the several component parts of the compound or composite material are such as to provide a particular and purposeful interaction therebetween so that the material, acting in composite fashion, produces the results desired. Thus, it is within the realm of this invention to provide a material resistant to thermal shock and characterized by its prolonged resistance to dimensional changes resulting from corrosion and/or erosion which consists essentially of a base or carrier substance and a protective substance interspersed therewithin, neither of which substances by itself is effective to produce the results attained by their combination.

Other objects and advantages of the present invention appear from the specification hereinafter. In the drawing herewith, FIG. 1 is a longitudinal section taken through the portion of a rocket motor constructed in accordance with this invention;

Figure 1:
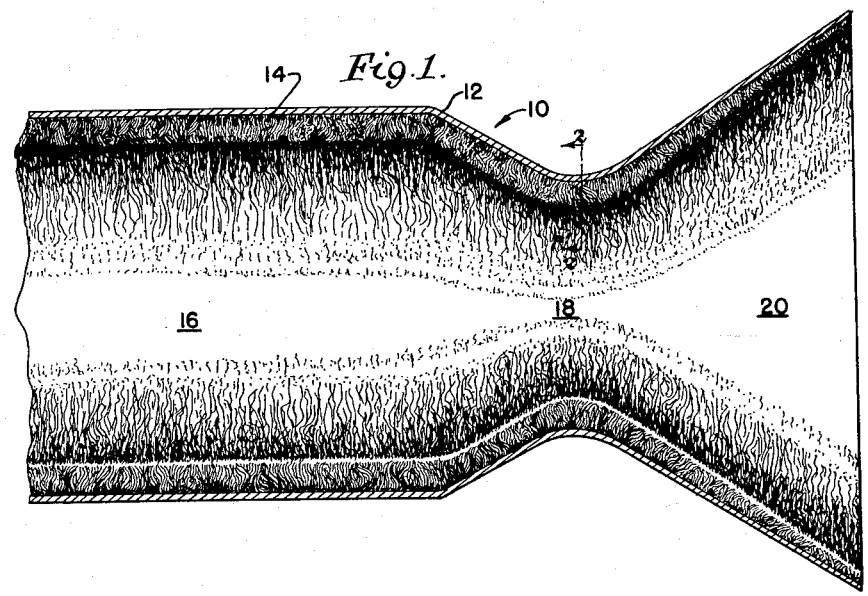

Referring now more particularly to FIG. 1, the structure shown therein and indicated by the reference character 10 represents a longitudinal section of a rocket engine utilizing the principles of the present invention and will be seen to consist essentially of outer casing 12 provided with a liner 14, the details of which form the essential characteristics of the present invention, and which material 14 is characterized by its ability to resist thermal shock and at the same time to remain substantially intact dimensionally so as to avoid any changes in cross sectional area which would otherwise detrimentally affect the performance of the rocket engine. As shown, the engine includes a combustion space 16, a throat area 18 and the exhaust nozzle or diffusing area 20. The shell 12 which may be used is intended primarily to impart structural rigidity to the assemblage whereas the material 14 forms an insulation protecting the shell 12 and preserving the structural integrity thereof while, at the same time, the material 14 operates to produce the effects as shown. The problem with which the present invention is concerned is to provide some means which will enable the engine to be made of lightweight form and, to this end, the shell 12 need not be of great mass inasmuch as deleterious effects produced by heat are largely eliminated due to the insulating action of the liner material 14.

In operation, the rocket motor interior will be subjected to the rapid passage therethrough of extremely hot gases emanating as the products of decomposition of the particular fuel utilized. The presence of these exhaust gases travelling at high speeds will tend to ablate the interior surfaces of the engine by corrosion and/or erosion and, under normal circumstances, such ablation will manifest itself in more or less radical changes in cross sectional area, particularly in the throat area 18 of the engine. In order to compensate for the effects of ablation and to minimize ablation in the first place, the engines may be made of relatively massive material and further may be provided with some means for cooling the walls. This solution to the problem inherently provides for other problems, particularly complexity of construction and massiveness giving rise to weight penalties to the system. Consequently, an outstanding feature of the present invention is the provision of insulation means 14 which sufficiently protects the shell 12 as to enable the latter to be made of extremely lightweight construction without sacrificing structural rigidity during use.

Another problem encountered in this field is the effect of thermal shock which is most noticeable under such aggravated conditions as when a rocket engine may be shut down or purposely inoperative for an extended period of time while the engine is exposed to outer space conditions or otherwise under conditions at which the ambient temperature is extremely low. For example, in an orbiting space vehicle, the rocket engines which control the attitude of the vehicle and/or reentry will normally be subjected to long periods at which the engines are shut down. Consequently their starting temperature will be extremely low and the temperature differential existing between the rocket engine and the exhaust gasses will be extreme, subjecting the rocket engine to profound thermal shock.

The liner material 14 according to this invention consists essentially of a base or carrier material which in and of itself would be ineffective to withstand any substantial degree of thermal shock and which under normal circumstances when used alone would exhibit a substantial degree of ablation. However, the liner material 14 contains in addition to this carrier substance or material a protective material which protects the carrier material from profound thermal shock and which also, in addition to this protection, effects a sufficient cooling of the base or carrier material during use so that the carrier material does not ablate to any substantial degree but, rather, produces a residue which substantially faithfully maintains the dimensional integrity of the rocket engine interior. More specifically, the carrier material decomposes into a coke-like substance which does not materially affect cross sectional areas of the rocket engine and which by its very porosity and roughnes forms a good surface upon which the protective material is coated and to which such protective material clings so that the protective material, rather than being blown away by the high velocity gasses remains as a coating upon the interior surface of the coke-like mass until such protective material has been vaporized. In this fashion, the protective material is rendered extremely efficient since the greatest amount of heat is thus dissipated at the interior surface of the rocket engine.

That is to say, the protective material being initially a solid, absorbs sensible heat, heat of fusion, further sensible heat, heat of vaporization and, to some extent, also decomposes so as to further insulate by the heat of pyrolysis. The carrier also dissipates heat although to a lesser degree than were it used alone. That is, the carrier fuses, vaporizes and decomposes to some degree which is less than would be the case in the absence of the protective material. The protective material arrests the fusion, vaporization and decomposition, at the coke residue stage, allowing such residue to remain. Stated another way, the combination of carrier and protective materials is such that they cooperate to arrest decomposition of the carrier and thereby form a residue, which residue exhibits a high degree of retention of the protective material when in the fused state, whereby the greatest amount of heat exchange is employed for protecting the liner directly and thereby indirectly protecting the shell containing the liner.

Figure 2:
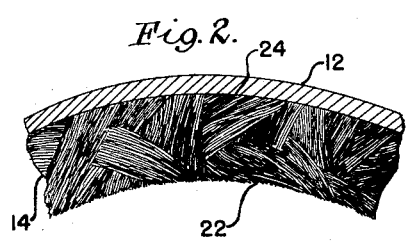
FIG. 2 is an enlarged sectional view taken along the plane of section line 2—2 in FIG. 1.

The protective material is interspersed or distributed throughout the mass of the carrier material and such interspersion may be achieved in any practical desired manner. However, as a preferred embodiment illustrated in the drawing, the protective material is in the form of fibers which run generally between the inner and outer surfaces of the carrier material, substantially as is shown in FIG. 2 wherein it will be appreciated that the fibers illustrated therein run generally between the inner surface indicated by reference character 22 and the outer surface at the interface 44 between the liner material 14 and the inner surface of the shell 12. These fibers in and of themselves materially enhance the structural characteristics of the liner 14 and may be incorporated in the composite construction in various and sundry fashions. For example, the fibers may be incorporated as a random lay of single chopped filaments, a random lay of chopped rovings, yarns or threads, as a laminated woven cloth, rovings or yarns or as woven tapes of various warp and weave densities wherein the tapes are of laminated configuration. Preferably, however, the random lay of chopped rovings as is shown in FIG. 2 is utilized wherein the rovings or yarn are oriented at right angles to the center line of the rocket engine. This relationship will be more readily apparent from a simultaneous consideration of FIGURES 2 and 3 in which the two sections involved are taken respectively at right angles to the center line and parallel to the center line.

Figure 3:
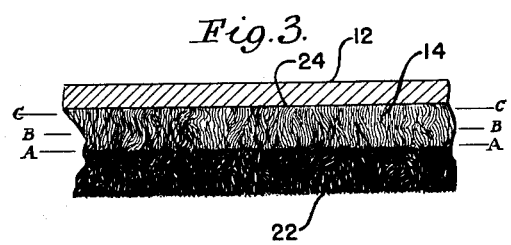
FIG. 3 is an enlarged partial longitudinal section illustrating the structure subsequent to use.
Figure 4:
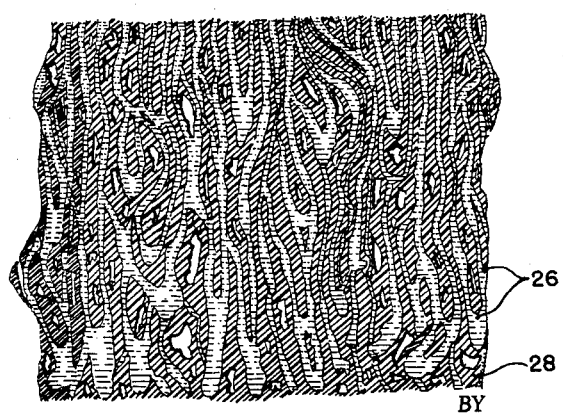
FIG. 4 is an enlarged fragmentary planned view of the surfaces of the material illustrating the manner in which the cooling of the base or carrier material is effected when the rocket is in operation.

With such a construction, the filaments of fibers will fuse and vaporize from the inside out as is shown in FIG. 3 wherein the portion below the line A—A indicates that portion of the liner material which has been decomposed to provide the coke-like substance and within the area of which the individual fibers or filaments of the protective material have been largely exhausted by the fusion and vaporization as aforesaid. FIG. 4 illustrates the wetting action cooperatively achieved by the proper selection of carrier and protective materials and, in this figure the reference character 26 indicates areas of the coke residue 28 which are wetted by the fused protective material. According to the present invention, it has been found that the protective material is best formed as fibers or filaments of boron oxide which, when used in conjunction with a carrier material in the form of a phenolic resin available as Flexiphen 160 (Kopfers Co.), these materials exhibit superior interaction for the retention of the fused boron oxide until the same has been vaporized. The phenolic resin, Flexiphen 160 is composed of formaldehyde and hydrocarbon chains of the paraffin series of two or more carbon atoms arranged in chains of alternate molecules of phenol and one or the other of the linking molecules. That is to say, these two particular materials have been found to be most advantageous in effecting an insulation under the conditions encountered in the interior surface of the rocket engine.

Alternatively, the boron oxide can be combined with one or more oxides of sodium, potassium, lithium, silicon and calcium in which such oxides may be present in quantities up to 10% by weight of the boron oxide fibers. It is important in practicing this invention to insure that the carrier material is compatible with the protective material so that the protective material does not tend to accumulate as droplets or globules which can be easily borne away but wherein the fused protective material rather exhibits a wetting tendency and tends to form a relatively thin coating on the surface of the carrier material. The particular phenolic resin specified exhibits this compatibility with boron oxide to a maximum degree. The phenolic resin, rather than being carried off by corrosion and/or erosion, is sufficiently protected by the boron oxide that the resin forms a coke-like residue which does not materially deviate from the original cross sections throughout the rocket engine before use.

Referring again to FIG. 3, it will be appreciated that the longevity of the liner material 14 is substantial, the lines BB and CC indicating progressive depths of coking and exhausting of the boron oxide or protective material which may occur during usage of the engine either as a continuous operation thereof or as a result of a series of shorter length operations. In any event, the liner 14 may be made of a thickness as required by the conditions of operation to which it will be subjected and in the event that insolated sections of the rocket engine may require additional insulation or cooling effect, exterior cooling according to any of the well known and conventional practices may be employed. Under some circumstances, such additional cooling may be required in the throat region of the engine.

As stated above, phenolic resins are to be preferred as the carrier material. However, there are some circumstances in which their use is not indicated even though, to date, they have been found to offer the greatest compatibility with the protective material. For example, the phenolic resins require molding under relatively high pressures which limits their practical application to smaller size rocket engines. Molds of large size capable of withstanding the pressures involved tend to be expensive so that, in some cases, other plastic materials having less compatibility but which lend themselves to cheaper construction may be preferred. To this end, more easily fabricated plastic materials such as epoxy resins may be employed because their ease of application by brush or spray eliminates the aforementioned expensive molds. Thus, in those instances where expense of fabrication dictates, plastic materials other than the preferred phenolic resins may be used.

In any case, the cooperation between the carrier material and the protective material is such that the protective material, which is fusible at the temperature of the exhaust gasses, arrests decomposition of the carrier to an extent that a residue of the carrier remains for retention of the fused protective material. Thus, the composite material as a whole cools and protects the engine while the protective material of the composition controls the degree of decomposition of the carrier material. To achieve these effects, the protective material should representatively be present in an amount ranging between about 25 to about 50% of the total weight of the composite material.

It is to be understood that certain changes and modifications as illustrated and described may be made without departing from the spirit of the invention or the scope of the following claims.

What is claimed is:
1. A rocket engine comprising a shell, and
a liner for said shell,
said liner consisting essentially of a phenol formaldehyde resin carrier having a substantial wall thickness and defining at least the throat and nozzle areas of the engine, and fibers of boron oxide embedded in said carrier to extend between the inner and outer surfaces thereof.
2. The engine according to claim 1 wherein said fibers are arranged in layers extending perpendicular to the axis of the engine.
3. A material usable in high temperature-gas erosion applications,
said material comprising a combination of phenol formaldehyde resin carrier and protective material, in which the protective material is interspersed throughout the carrier and acts to control consumption of the carrier such that the carrier progressively forms and remains as a coke residue of substantially the same dimensional characteristics as the original material,
said carrier constituting not less than about half the total weight of the material and said protective material consisting essentially of boron oxide fibers which are progressively exposed as the carrier is charred to its residue.
4. Material according to claim 3 wherein said protective material also includes fibrous oxide selected from the group consisting of sodium oxide, potassium oxide, lithium oxide, silicon oxide, calcium oxide and mixtures thereof,
such additional oxides being present in an amount up to about 10%, by weight, of the boron oxide.

References Cited by the Examiner
UNITED STATES PATENTS

| 2,706,188 | 4/55 | Fitko et al. | 260—38 |
| 2,835,107 | 5/58 | Ward | 60—35.6 |
| 2,985,613 | 5/61 | Campbell | 260—38 |
| 2,992,960 | 7/61 | Leeg et al. | 60—35.6 |
| 3,124,542 | 3/64 | Kohn | 260—2.5 |

FOREIGN PATENTS 757,890  9/56  Great Britain.

OTHER REFERENCES

Aviation Week publication, Feb. 13, 1961, pages 67, 69, 71, 72 relied on.

Jet Propulsion publication, November 1956, pages 969–972 relied on.

Astrolite, H. I. Thompson Fiber Glass Co., Products Bulletin No. PB 7–24A, July 1, 1959, pages 1–9 relied on.

SAMUEL LEVINE, *Primary Examiner.*